United States Patent [19]

Reese et al.

[11] Patent Number: 4,497,912

[45] Date of Patent: Feb. 5, 1985

[54] FINE PARTICULATE, EXPANDABLE STYRENE POLYMERS SUITABLE FOR THE PRODUCTION OF RAPIDLY MOLD-EJECTED CELLULAR BODIES

[75] Inventors: Dirk Reese, Marl; Josef K. Rigler, Recklinghausen, both of Fed. Rep. of Germany

[73] Assignee: Chemische Werke Hüls AG, Marl, Fed. Rep. of Germany

[21] Appl. No.: 621,270

[22] Filed: Jun. 18, 1984

[30] Foreign Application Priority Data

Jul. 14, 1983 [DE] Fed. Rep. of Germany ....... 3325392

[51] Int. Cl.$^3$ ............................................... C08J 9/20
[52] U.S. Cl. ....................................... 521/59; 521/56; 521/60; 521/139; 521/140; 525/297
[58] Field of Search .................. 521/56, 60, 139, 140, 521/59; 525/297

[56] References Cited

U.S. PATENT DOCUMENTS

| | | | |
|---|---|---|---|
| 3,616,365 | 10/1971 | Stastung et al. | 521/60 |
| 3,709,806 | 1/1973 | Minami et al. | 521/60 |
| 3,743,611 | 7/1973 | Muroi et al. | 521/60 |
| 4,168,353 | 9/1979 | Kitamori | 521/59 |
| 4,303,756 | 12/1981 | Kajimura et al. | 521/60 |
| 4,303,757 | 12/1981 | Kajimura et al. | 521/60 |
| 4,379,859 | 4/1983 | Hirosawa et al. | 521/56 |

OTHER PUBLICATIONS

Von Roland Streck, "Die Olefin –Metathese, ein vielseitiges Werkzeug der Petro–und Polymerchemie", Oct. 1975, Chemiker-Zeitung, vol. 99, pp. 397–413.
DIN (German Industrial Standard) 53,728, Mar. 1975, pp. 1–4.

Primary Examiner—Morton Foelak
Attorney, Agent, or Firm—Wells & Wells

[57] ABSTRACT

Fine particulate expandable styrene polymers suitable for the production of molded bodies with improved minimum mold dwell times, containing 0.01 to 2.0% by weight, referred to the polystyrene or the total of the polymerized monomers, of polyoctenamer having I values from about 10 to 400 ml/g and trans octylene contents from about 20 to 90%.

4 Claims, No Drawings

FINE PARTICULATE, EXPANDABLE STYRENE POLYMERS SUITABLE FOR THE PRODUCTION OF RAPIDLY MOLD-EJECTED CELLULAR BODIES

CROSS-REFERENCE TO A RELATED APPLICATION

Applicants claim priority for application No. P 33 25 392.7, filed July 14, 1983, in the Patent Office of the Federal Republic of Germany.

BACKGROUND OF THE INVENTION

The field of the invention is synthetic resins having pore forming and the present invention is particularly concerned with expandable styrene polymers suitable for the production of rapidly mold-ejected cellular bodies containing therein a reacted, uniformly distributed compound of high molecular weight forming a non continuous phase.

The state of the art of preparing fine particulate, expandable styrene polymers suitable for the production of cellular bodies which are rapidly ejected from molds may be ascertained by reference to U.S. Pat. Nos. 2,857,339; 2,857,340; 3,224,984; 3,468,820; 3,503,905; 3,503,908; 3,558,534; 3,972,843; and 4,243,717; British Pat. Nos. 1,083,040; 1,172,292; 1,297,105; and 1,106,143; West German Published Application No. 1,959,729; and Japanese Patent Document No. 71/21,453, the disclosures of which are incorporated herein by reference.

The preparation of the polyoctenamer starting material of the present invention is disclosed in CHEMIKER-ZEITUNG, Vol. 99 (1975), pp. 397–413, the disclosure of which is incorporated herein by reference.

It is known to manufacture molded foam bodies by expanding fine-particulate styrene polymers in molds. In this process, fine particulate, expandable styrene polymers first are subjected by means of steam or hot gases to a prefoaming process. The prefoamed particles are first stored and then are final foamed further in perforated molds with superheated steam, and sintered. Following this final foaming to completion, the molded body must remain some additional time in the mold until it has cooled sufficiently to be removed without warping its shape. This dwell time in the mold is designated as the minimum mold dwell time or the cooling time and represents a down time which one tries to minimize to optimize mold use.

Especially those expandable styrene polymers which are made flame-retardant by means of organic halogen compounds more readily form products with irregular cell structures. Foam blocks made of such flame retardant particles following mold ejection are more susceptible to having their sides collapse (block shrinkage) and are rather more weakly welded together inside the block.

It is desirable, when prefoaming the beads, that part of the prefoamed beads be prevented from shrinking. As a result, the desirable low densities of the molded bodies are not achieved. Furthermore, a high loss in expanding agent is related to the shrinkage, whereby again the above-mentioned drawbacks of block shrinkage and inadequate fusion inside the molded body are incurred. Lastly, an uneven surface of the molded body is the result.

A number of processes have become known which make it possible to shorten the cooling times and hence to obtain ejected molded bodies more rapidly, for instance by coating the expandable or prefoamed particles with paraffin oil as disclosed in British Pat. No. 1,083,040, and West German Published Application No. 1,959,729, or with oil soluble emulsifiers as disclosed in U.S. Pat. No. 3,503,908. Further, it is taught that rapidly ejected cellular bodies can be obtained provided the expandable particles contain slight amounts of water in finely distributed form during manufacture, as disclosed in British Pat. No. 1,106,143, or when the manufacture of the expandable particles is carried out by polymerizing in the presence of slight amounts of certain bromine compounds as disclosed in U.S. Pat. No. 3,503,905 and British Pat. No. 1,172,292. In a series of prior art processes the polymerization is also carried out in the presence of slight amounts of polystyrene incompatible polymers as disclosed in British Pat. No. 1,297,105, U.S. Pat. Nos. 2,857,339; 2,857,340; 3,224,984; 3,558,534; and 3,468,820; and Japanese patent application No. 71/21,453, a low cooling time having been observed in part, but in part also the additives exerting practically no effect on the cooling time. The following are listed as incompatible polymers: polyethylene, atactic polypropylene, polyisobutylene, polyvinylidene chloride, copolymers of ethylene and vinylacetate or of styrene, acrylonitrile and N-vinylcarbazole, or condensation products of phthalic acid and hexane triol, further such elastomers as butadiene-styrene copolymers, polybutadiene, and polyisoprene are incompatible polymers also.

U.S. Pat. No. 3,972,843 discloses the use of butene-(1) polymers or copolymers as additives to reduce the minimum mold dwell time. Fischer-Tropsch waxes are disclosed in U.S. Pat. No. 3,972,843 (control tests 1g and h) and in U.S. Pat. No. 4,243,717.

SUMMARY OF THE INVENTION

However, the additives of high molecular weight compounds of the state of the art that have been used still are not entirely satisfactory because they result in either unsightly expandable particles or fail to weld together adequately, or do not produce lesser cooling times.

In particular, the compounds of high molecular weight of the state of the art do not permit their being added in the conventional suspension polymerization when the expandable styrene polymers are produced because they do not uniformly distribute themselves in the beads or they render the suspension so unstable that the polymerization is hampered.

Now it has been found that expandable styrene polymers suitable for the manufacture of especially rapidly ejectable cellular bodies and containing a water insoluble compound of high molecular weight which is soluble in the monomers and forms a non continuous phase with the styrene polymers is obtained when the styrene polymers contain the compounds of high molecular weight in the form of a polyoctenamer in amounts of about 0.01 to 2.0% by weight referred to the polystyrene. In particular, the polyoctenamer is present in amounts of 0.01 to 0.5% by weight.

The minimum mold dwell time is reduced to 5 to 20 minutes and, for this reduced time, the percentage of shrinkage is reduced to 0.6 to 1.2 per cent.

DESCRIPTION OF THE PREFERRED EMBODIMENTS

Polyoctenamer is known to be prepared by polymerizing cyclooctene, as disclosed for instance in CHEMIKER-ZEITUNG, Vol. 99 (1975), pp. 397–413.

Polyoctenamer generally has a solution viscosity between 10 and 300 ml/g, being designated by the I value. This I value corresponds to 100 times the reduced specific viscosity measured analogous to DIN (German Industrial Standard) 53,728, using toluene as a solvent. Especially suitable polyoctenamers are those having a solution viscosity between about 10 and 400 ml/g. The content in trans-octylene is from about 20 to 90%; preferably products are used which have a transoctylene content from 40 to 80%.

Expandable, foamable styrene polymers are homopolymers or also copolymers of styrene or p-methylstyrene.

The following are applicable comonomers: alpha-methylstyrene, nuclear halogenated styrene such as 2,4-dichlorostyrene, acrylonitrile, methacrylonitrile, esters, alpha-beta-unsaturated carboxylic acids with alcohols containing 1 to 8 carbon atoms such as acrylic acid and methacrylic acid esters, and vinylcarbazole.

The comonomers are present in the styrene polymers by no more than 50% by weight. Slight amounts of butadiene or divinylbenzene may also be used as comonomers.

The conventional gaseous or liquid organic compounds which do not dissolve the styrene polymer but merely swell it and of which the boiling point is below the polymer softening point are contained in the foamable styrene polymers as the expanding agents.

Illustratively such expanding agent compounds are aliphatic hydrocarbons such as propane, butane, pentane, hexane; cycloaliphatic hydrocarbons such as cyclohexane; further halogen hydrocarbons such as dichlorodifluoromethane or 1,2,2-trifluoro-1,1,2-trichloroethane.

Mixtures of these compounds also are suitable.

Where appropriate or desired, solvents such as methanol or ethanol mixed with hydrocarbons and/or halogen hydrocarbons are also useful as the expanding agents.

The expanding agents are used in amounts of 3 to 15% by weight, in particular 5 to 7% by weight referred to the polymer.

The expandable styrene polymers are prepared especially by suspension polymerizing the monomeric styrene and possibly the comonomers in the presence of the conventional activators such as peroxides or azo activators and suspension stabilizers such as tricalcium phosphate or organic colloids such as polyvinyl alcohol, polyvinyl pyrrolidone or hydroxyethyl cellulose in the presence of the designated expanding agents and the designated polyoctenamers and possibly further compounds of high molecular weights forming a discontinuous phase. However, it is also possible to prepare the expandable styrene polymers for instance by mass polymerization. Again styrene polymers free of expanding agents and already containing the designated compounds of high molecular weight and which were made by prior art mass or suspension processes in the form of granulates or beads, can be subsequently impregnated with the designated expanding agents. This impregnation can be carried out in aqueous suspension or also after melting in an extruder, and as regards the latter case, the strands leaving the extruder are comminuted while final foaming is avoided.

Since the polyoctenamer is homogeneously soluble in styrene, it is therefore also uniformly distributed in the styrene polymer.

The cooling time reducing effect of the polyoctenamer also takes place when the molecular weights of the styrene polymer are lower than conventional.

Such lowering of the molecular weight, expressed by the K value, can be obtained by adding regulating substances during polymerization, illustratively: dimeric alphamethylstyrene or tertiary dodecylmercaptan. These regulating substances are used in amounts from 0.005 to 0.05% by weight, especially 0.01 to 0.03% by weight referred to the mixture of monomers and polyoctenamer.

The expandable styrene polymers furthermore may contain flame retardants, softeners, stabilizers, antistatic agents, dyes, fillers, or mixtures thereof.

EXAMPLE

A mixture of 100 parts by weight of fully desalted water, 100 parts by weight of styrene, 0.4 part by weight of benzoylperoxide, 0.1 part by weight of tert. butylperbenzoate, 0.75 part by weight of hexabromocyclododecane, 0.30 part by weight of dicumyl peroxide and the kind and amount of additives (dissolved in styrene) listed in the following table is heated with agitation to 90° C. in a pressure-proof stainless steel agitator vessel. After 2 hours at 90° C., 5 parts of a 2% aqueous solution of polyvinyl alcohol are added. After another 2 hours, 7 parts by weight of a mixture of isopentane and n-pentane as the expanding agent is added within 10 to 15 minutes. This preparation, following another hour at 90° C., is heated to 120° C. and kept at this temperature for 6 hours.

Upon terminating the polymerization cycle, the substance is cooled, the bead polymer produced is separated from the aqueous phase, dried and sifted.

The bead fraction between 1mm and 2mm diameter is prefoamed in a continuous agitator-prefoamer of the Rauscher type, using flowing steam, down to a bulk weight of 15 g/liter, then it is interim-stored for 24 hours and next foamed to completion in a block mold, of the Rauscher type and of $100 \times 50 \times 100$ cm dimensions, into foamed blocks.

The following table lists the test results:

TABLE

| Example | | Parts by weight | Bulk weight (g/l) | Steam pressure (bars) | Minimum mold dwell time (min.) | Shrinkage[3] (%) |
|---|---|---|---|---|---|---|
| 1 | polyoctenamer, I = 120 ml/g trans content = 60% | 0.10 | 16.4 | 1.95 | 17 | 0.8 |
| 2 | polyoctenamer, I = 120 ml/g trans content = 60% | 0.20 | 15.1 | 1.95 | 9 | 1.2 |
| 3 con- | Fischer-Tropsch wax (U.S. Pat. No. | 0.20 | 15.7 | 1.95 | 16 | 1.2 |

TABLE-continued

| Example | | Parts by weight | Bulk weight (g/l) | Steam pressure (bars) | Minimum mold dwell time (min.) | Shrinkage[3] (%) |
|---|---|---|---|---|---|---|
| trol | 4,243,717) | | | | | |
| 4 control | Ethylenevinyl acetate copolymer (Japanese patent document A-71/21,453) | 0.20 | | suspension is unstable | | |

[1] Vapor pressure in the block mold
[2] The earliest time lapse after which the steamed molded body can be ejected from the mold. The decay of the internal pressure to nearly atmospheric is the criterion used.
[3] Block shrinkage means the collapse of the lateral surfaces measured 24 hours after block manufacture. Block shrinkage is determined by measuring the block thickness from the surface opposite the first, the measurement being at a right angle. The difference between the inside mold dimension at that location and the block thickness as a percentage of the inside mold dimension is the block shrinkage.

What we claim is:

1. In the method for producing particulate molding compositions for the production of foamed articles by polymerizing styrene monomer in aqueous suspension under intensive mechanical stirring in the presence of an expanding agent and in the presence of water-insoluble high molecular weight compound which is oluble in the styrene monomer and forms a discontinuous phase with the polymer produced, the improvement comprising as said high molecular weight compound a polyoctenamer having a concentration of 0.01 to 2.0 percent by weight based on the styrene.

2. The method of claim 1, wherein said polyoctenamer has a solution viscosity of about 10 to 400 ml/g (I value) and a trans octylene content of 20 to 90%.

3. The method of claim 2, wherein said polyoctenamer has a trans octylene content from 40 to 80%.

4. The method of claim 3, wherein said polyoctenamer concentration is 0.01 to 0.5% by weight.

* * * * *